United States Patent [19]

DeJule et al.

[11] Patent Number: 5,373,393
[45] Date of Patent: Dec. 13, 1994

[54] OPICAL INTERFEROMETRIC DEVICE WITH SPATIAL LIGHT MODULATORS FOR SWITCHING SUBSTANTIALLY COHERENT LIGHT

[75] Inventors: Michael C. DeJule; Nabeel A. Riza, both of Clifton Park; Donald E. Castleberry, Schenectady, all of N.Y.; Thomas L. Credelle, Los Gatos, Calif.

[73] Assignee: General Electric Company, Schenectady, N.Y.

[21] Appl. No.: 69,501

[22] Filed: Jun. 1, 1993

[51] Int. Cl.$^5$ .............................................. G02B 1/00
[52] U.S. Cl. .................................... 359/320; 359/42; 359/316; 359/315
[58] Field of Search ............... 359/320, 250, 251, 252, 359/254, 316, 317, 107, 108; 356/345

[56] References Cited

U.S. PATENT DOCUMENTS 5,117,239  5/1992  Riza .................................. 342/375
5,317,445  5/1994  De Jule et al. ..................... 359/250

OTHER PUBLICATIONS

"Electrically Controlled Optical Switch for Multimode Fiber Applications", Wagner et al, Applied Optics, vol. 19, No. 10, Sep. 1990, pp. 986–988.
"Electrically Controlled Optical Switch for Multimode Fiber Applications," Wagner and Cheng, Applied Optics, vol. 19, No. 17, Sep. 1980, pp. 2921–2925.
"Nematic Liquid Crystal Modulator with Response Time Less than 100 μs at Room Temperature", S. T. Wu, Applied Physics Letters, vol. 57, No. 10, Sep. 1990, pp. 986–988.
"Small Angle Relaxation of Highly Deformed Neumatic Liquid Crystal," S. T. Wu and C. S. Wu, Applied Physics Letters, vol. 53, No. 19, Nov. 1988, pp. 1794–1796.
GE Technical Information Series Report entitled "Interferometric Techniques for Characterizing Nematic Liquid-Crystal Optical Phase Modulators", N. A. Riza, Apr. 1991, pp. 1–21.
"Switched Holograms for Reconfigurable Optical Interconnection: Demonstration of a Prototype Device", by J. B. McManus, R. S. Putnam, and H. J. Caulfield, Applied Optics, vol. 27, No. 20, Oct. 15, 1988, pp. 4244–4250.

Primary Examiner—Scott J. Sugarman
Assistant Examiner—Audrey Chang
Attorney, Agent, or Firm—Enrique J. Mora; Marvin Snyder

[57] ABSTRACT

An interferometric optical switching device for switching substantially coherent light beams includes a plurality of interferometric switching cells arranged in matrix form. Each interferometric switching cell is independently controllable to selectively direct received light beams along at least a selected one of two axes. The device can be three-dimensionally expanded to increase the number of ports to which the light beams can be selectively switched, in which case the matrices can share integrally constructed interferometric switching cells. The device is further capable of providing bidirectional communication between predetermined ones of the ports thereof.

17 Claims, 4 Drawing Sheets

OPICAL INTERFEROMETRIC DEVICE WITH SPATIAL LIGHT MODULATORS FOR SWITCHING SUBSTANTIALLY COHERENT LIGHT

RELATED APPLICATIONS AND PATENTS

This application is related to the application entitled "Interferometric Spatial Switch for Polarized or Unpolarized Light", Ser. No. 08/069,474, filed concurrently with this application and assigned to the assignee of the present application, and which is incorporated herein by reference.

BACKGROUND OF THE INVENTION

This invention relates to optical switching devices and, more particularly, to an electrically controlled interferometric switching device for individually directing a plurality of substantially coherent optical beams to selected output ports.

Signal processing systems often employ multiple parallel processors which permit many operations to take place concurrently. These so called parallel processing architectures typically require switching devices capable of efficiently transferring the data signals among such parallel processors. It is particularly advantageous to use optical switching devices to selectively interconnect the multiple parallel processors. For example, optical signal beams provide greater operating bandwidth and superior immunity to electromagnetic interference as compared with electrical signals.

These optical switching devices must be capable of spatially switching large numbers of light beams while preserving the integrity of the signals communicated by such light beams. One approach generally used in the fabrication of these switching devices is to utilize a plurality of elementary switching cells which in combination provide the overall switching capacity of the device. In these switching devices, it is highly desirable to reduce the number of elementary switching cells required to switch a given number of light beams so that, for instance, the switching device becomes more compact while having lower fabrication costs.

An optical device for switching light beams is proposed by J. B. McManus, R. S. Putnam, and H. J. Caulfield in the paper entitled "Switched holograms for reconfigurable optical interconnection: demonstration of a prototype device", Vol 27, Applied Optics, pp. 4244-4250, 15 Oct. 1988. The device proposed by McManus et al., (hereinafter McManus), utilizes a plurality of polarization-dependent switching cells arranged in a two-dimensional matrix which, in general, can have M columns and N rows of switching cells. Each switching cell comprises a polarizing beamsplitter (PBS) and a spatial light modulator (SLM) which cooperate to selectively direct light beams externally applied to the matrix to selected outputs. Several disadvantages of the device proposed by McManus are that use of polarization-dependent switching cells can reduce light beam intensity (as may occur if a polarizer is used to polarize light to be used in a polarization-dependent system) and connections between such polarization dependent switching devices may require the use of polarization-maintaining fibers. Moreover, the device proposed by McManus is confined to a two-dimensional arrangement of switching cells (e.g., a single two-dimensional switching matrix), as McManus does not suggest how his device can be expanded into a three-dimensional arrangement of switching cells (e.g., a succession of identical two-dimensional matrices positioned parallel to each other). A device having such three-dimensional expansion capability can significantly increase the universe of selectable output ports to which the light beams can be switched. For example, if Q is the number of successive two-dimensional matrices positioned parallel to each other, then the number of selectable output ports will increase by a Q factor. Further, the operation of the McManus device is clearly distinct from an interferometric device being that the McManus device is not based on the principle of optical interference.

Polarization-independent types of switching devices have been suggested that enable an unpolarized light beam to be selectively directed along a predetermined path. One example of such a polarization-independent switch is described by Wagner and Cheng in "Electrically Controlled Optical Switch For Multimode Fiber Applications," Applied Optics, Vol. 19, No. 17, September 1980, pp 2921-2925. However, Wagner et al. do not suggest any two-dimensional arrangement for their switches, and much less a three-dimensional switching arrangement. Further, although the switch suggested by Wagner et al. is polarization-independent, it requires PBSs which add to reduction of light beam intensity as well as to the complexity and cost of the switch. Here again, Wagner et al. do not suggest an interferometric switch, i.e., a switch based on the principle of optical interference between substantially coherent light beams.

Accordingly, one object of the invention is to provide a two-dimensional interferometric optical switching device which can be controlled to individually and simultaneously direct substantially coherent light beams received by each of multiple interferometric switching cells thereof.

Another object of the invention is to provide an interferometric optical switching device which can be three-dimensionally expanded to provide additional selectable output ports for the light beams switched by the device.

SUMMARY OF THE INVENTION

Briefly, in accordance with the invention, an interferometric optical switching device capable of simultaneously and individually directing a plurality of externally derived substantially coherent light beams to a selected plurality of output ports is provided. The device comprises at least a first switching matrix which includes a plurality of interferometric switching cells arranged in columns and rows. Each of the interferometric switching cells is independently controllable such that individual light beams received by any given interferometric switching cell can respectively emerge therefrom along at least a selected one of first and second axes, in accordance with the phase differential between the light beams passing therethrough. Each interferometric switching cell in the first column of the matrix is positioned to receive a portion of the externally derived light beams. In a reverse mode of operation, each interferometric switching cell in the last row of the matrix is also capable of receiving a portion of the externally derived optical beams. Accordingly, each interferometric switching cell in a column subsequent to the first column is positioned to receive from a switching cell located in the preceding column of the same row light beams propagating along the selected second axis; or to pass to a switching cell located in a preceding column of the same row light beams propagating along the selected second axis. Similarly, each interferometric switching cell in a row preceding the last row is positioned to receive or to pass light beams propagating along the selected first axis bidirectionally with respect to a cell located in the subsequent row of the same column.

Each interferometric switching cell comprises a first switch unit optically coupled to a spatial light modulator which in turn is optically coupled to a second switch unit. The spatial light modulator preferably includes an array of individually controllable liquid crystal pixels. The spatial light modulator and the respective switch units of each interferometric switching cell cooperate to propagate through the matrix the externally derived light beams applied simultaneously to the first column or to the last row of the matrix so as to provide bidirectional communication between selected ports.

In one embodiment of the invention the switching device comprises a succession of substantially identical switching matrices identified by alternate odd and even designations. Each of the matrices is positioned in parallel alignment with each other across a common axis perpendicular to their rows and columns. In this embodiment, row interferometric means is capable of optically coupling each pair of consecutive matrices in which an odd numbered matrix (hereinafter "odd matrix") is followed by an even numbered matrix, (hereinafter "even matrix") and column interferometric means is capable of optically coupling each pair of consecutive matrices in which an even matrix is followed by an odd matrix. In accordance with this embodiment, in each interferometric switching cell of an odd matrix the spatial light modulator and the respective switch units cooperate to propagate light beams through the odd matrix in ascending column order within a row and in ascending row order within a column, while in each interferometric switching cell of an even matrix the spatial light modulator and the respective switch units therein cooperate to propagate light beams through the even matrix in descending row order within a column and in descending column order within a row.

Each interferometric switching cell is also capable of simultaneously directing each received optical beam along each of the two selected axes. Thus, each of the externally derived substantially coherent light beams can be simultaneously directed to at least two selected output ports.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
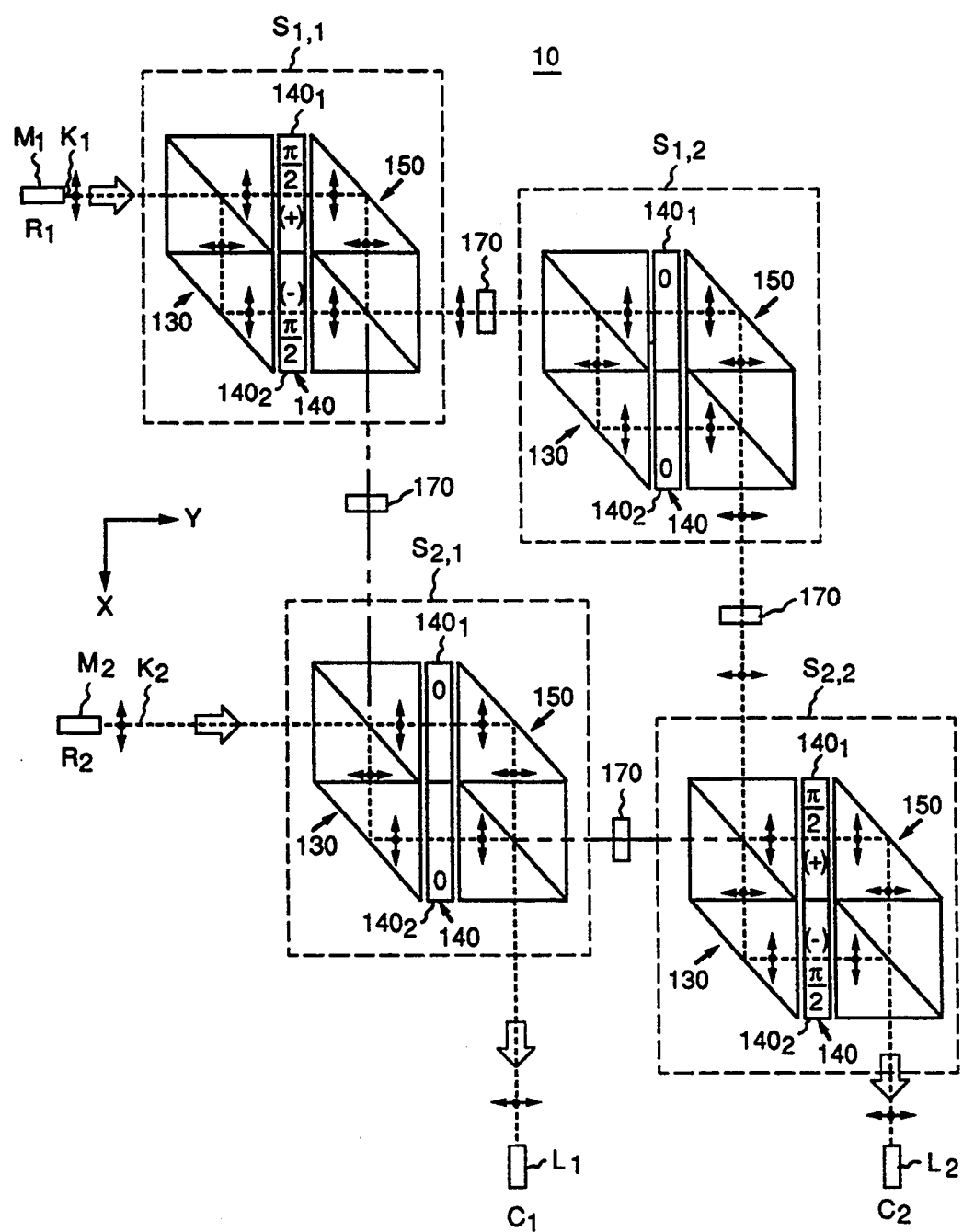
FIG. 1 is a schematic diagram showing a front elevation view of an interferometric optical switching device in accordance with an embodiment of the present invention.

FIG. 1 shows an interferometric optical switching device 10 capable of simultaneously and individually directing a plurality of externally derived substantially coherent light beams, e.g. $K_1$ & $K_2$, to a selected plurality of output ports, e.g., $L_1$ & $L_2$. As illustrated in FIG. 1, switching device 10 comprises four interferometric switching cells (ISCs) $S_{1,1}$, $S_{1,2}$, ... $S_{2,2}$ arranged to form a two-dimensional switching matrix having two columns $C_1$-$C_2$ and two rows $R_1$-$R_2$. In general, $S_{i,j}$ identifies an ISC located in the $i^{th}$ row and the $j^{th}$ column of a switching matrix comprising a plurality MxN of ISCs arranged in M columns and N rows.

Each ISC $S_{i,j}$, as illustrated in FIGS. 2A–2D, typically comprises a first switch unit 130 optically coupled to a spatial light modulator (SLM) 140 which is in turn optically coupled to a second switch unit 150. As used herein, "optically coupled" refers to an arrangement in which one or more light beams are directed from one optical component to another in a manner which maintains the integrity of the signal carried by the light beams. First switch unit 130 comprises respective beamsplitter means, such as a cube beamsplitter 132 coupled to an associated total internal reflection (TIR) prism 134; second switch unit 150 similarly comprises respective beamsplitter means, such as a cube beamsplitter 152 coupled to an associated TIR prism 154. As used herein, beamsplitter means refers to the entire beamsplitter assembly, not just the diagonal interface at which light separation or combination occurs. It should be appreciated that since first and second switch units 130 and 150 respectively use a nonpolarizing beamsplitter, i.e., a beamsplitter which does not alter the polarization of incident light, each first and second switch units can operate equally effectively on either polarized or unpolarized light. Therefore, each ISC can be either polarization-dependent or independent based on the predetermined characteristics of its respective SLM 140. That is, if SLM 140 has a predetermined polarization dependency so does the respective ISC. Alternatively, if SLM 140 is polarization-independent so is the respective ISC.

Each SLM 140 typically includes a two-dimensional array of individually controllable predetermined pixels $140_1$ and $140_2$ respectively illuminated by light beams passing through a respective ISC. Each pixel comprises a material responsive to a selected electrical control signal (not shown) applied thereto for selectively shifting the phase of light passing therethrough. The pixel material can be selected to have a suitable optical axis orientation or nematic molecular director which allows the pixel to operate either on polarized or unpolarized light. Each of the illustrated exemplary embodiments, in particular, incorporates a SLM adapted to operate on unpolarized light, i.e., light comprising both p and s linearly polarized components being respectively represented by the twin headed arrows and solid dots on exemplary light beams.

For explanatory purposes, and not by way of limitation, it will be assumed that each pixel comprises a nematic liquid crystal (LC) material. It will be understood by those skilled in the art that other materials can be equally effective as optical phase shifters (e.g., materials exhibiting the property known as the Faraday effect or ferroelectric smectic LCs). The nematic LC in each pixel may operate so that when the control signal applied thereto has one predetermined voltage level the molecular orientation of the LC causes an advancement to the phase of the light beam passing through the pixel. For example, the phase of the light beam may be selected to be advanced by +90°, indicated by a $+\pi/2$ designation in so selected pixels. Alternatively, another predetermined voltage level of the control signal applied to a respective pixel may cause a retardation to the phase of the light beam passing through the pixel. For example, the phase of the light beam may be selected to be retarded by −90°, indicated by a $-\pi/2$ designation in so selected pixels. In this mode of operation, predetermined pixels $140_1$ and $140_2$ can thus cooperate to effectively impart an overall 180° phase differential between light beams respectively passing therethrough. Alternatively, the voltage level of the control signal respectively applied to predetermined pixels may be selected such that the phase differential of light beams passing therethrough is 0°, indicated by a 0 designation in so selected pixels. Thus, predetermined pixels in the SLMs can be set to selectively shift the phase differential between light beams passing therethrough. This mode of operation is particularly useful to improve the switching speed of each ISC. Analysis by S. T. Wu and C. S. Wu, in "Small Angle Relaxation of Highly Deformed Nematic Liquid Crystal," Applied Physics Letters, Vol. 53, No. 19, 1988, pp. 1794–1796, indicates that the on-off response time of a nematic LC is directly proportional to the square of the refractive index change required from each pixel to provide the overall 180° phase differential between the light beams passing therethrough. Therefore, the cooperating predetermined pixel pair has an on-off response time four times faster than it would be possible with the use of a single pixel, i.e., the use of a single pixel to individually provide a 180° phase differential between passing light beams.

As seen in FIG. 1, each ISC in the first column $C_1$ is positioned to receive a portion of the externally derived substantially coherent light beams, $K_1$ & $K_2$. As indicated by the single headed arrows along the light beams shown in FIG. 1, and as will be explained in greater detail, light beams applied to the first column of ISCs can be selectively directed through the switching matrix in ascending column order within a row and in ascending row order within a column so that externally applied light beams reach selected output ports $L_1$ & $L_2$ associated with the last row of ISCs. In a reverse mode of operation, externally derived substantially coherent light beams can be applied to each ISC in the last row $R_2$ through ports $L_1$ and $L_2$, here functioning as input ports. The input or output function of such ports is solely defined in terms of the direction of the light beams passing therethrough. In the reverse mode of operation, the applied beams can be selectively directed through the switching matrix in descending row order within a column and in descending column order within a row (i.e., in directions opposite to the single headed arrows along the light beams shown in FIG. 1) so as to reach selected ports $M_1$ & $M_2$ associated with the first column of ISCs.

Figure 2A:
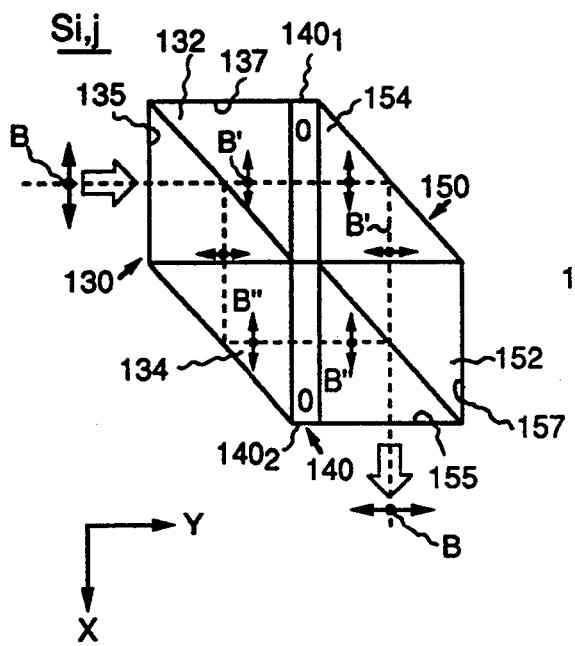
FIGS. 2A through 2D are schematic diagrams showing respective front elevation views of a single interferometric switching cell (ISC)

Each single ISC, as respectively illustrated in FIGS. 2A–2D, enables substantially coherent light beams received by a first or a second input face 135 and 137, respectively, of the ISC to be selectively switched along either a first or a second axis (here the X and Y axes, respectively). By way of example and not of limitation, a representative substantially coherent beam of unpolarized light "B" is illustrated in FIG. 2A incident on the first input face 135 of ISC $S_{i,j}$.

Beam B is split in beamsplitter 132 into a substantially identical constituent pair of beams, represented as B' and B". Beam B' passes through first switch unit 130 along substantially the same path as incident beam B and into a predetermined pixel $140_1$ of SLM 140; beam B" is deflected in beamsplitter 132 such that it is incident on TIR prism 134 and then optically coupled to a different predetermined pixel $140_2$ in SLM 140. In FIGS. 2A–2D, cube beamsplitters are shown and thus the angle of deflection is typically about 90°; alternatively, other types of beamsplitters may be used in which the deflection angle is other than 90°. As illustrated in FIG. 2A, the two predetermined pixels in SLM 140 through which beams B' and B" respectively pass are respectively set such that beams B' and B" emerge from SLM 140 with a phase differential of 0° which is carded to second switch unit 150. Beam B' is incident on TIR prism 154 and is deflected into beamsplitter 152; beam B" passes from SLM 140 directly into beamsplitter 152. The phase differential (here 0°) between beams B' and B" is such that when respective components thereof are combined along predetermined coincident collinear paths, they mutually interfere constructively (in-phase components interfere constructively, while out-of-phase components interfere destructively) in beamsplitter 152 to form one substantially coherent light beam B that emerges from ISC $S_{i,j}$ through a first output face 155 along the selected first axis (here the X axis).

Figure 2C:
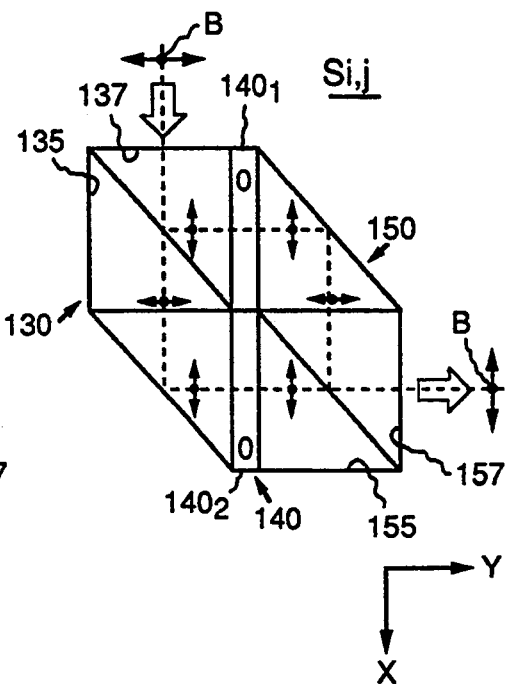
Figure 2B:
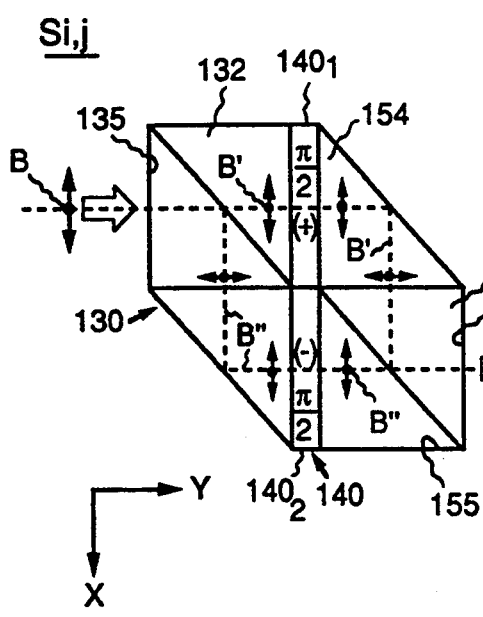

FIG. 2B illustrates an ISC $S_{i,j}$ with predetermined pixels $140_1$ and $140_2$ in SLM 140 respectively set to cooperatively impart an overall 180° phase differential between respective light beams passing therethrough. The operation is as described above with the exception that beams B' and B" undergo, respectively, +90° and −90° phase shift as each passes through pixels $140_1$ and $140_2$, respectively. In accordance with such 180° phase differential between beams B' and B", when respective components thereof are combined along such predetermined coincident collinear paths, the respective components mutually interfere constructively in beamsplitter 152 to form one substantially coherent light beam B that emerges from ISC $S_{i,j}$ through a second output face 157 along the selected second axis (here the Y axis).

Figure 2D:
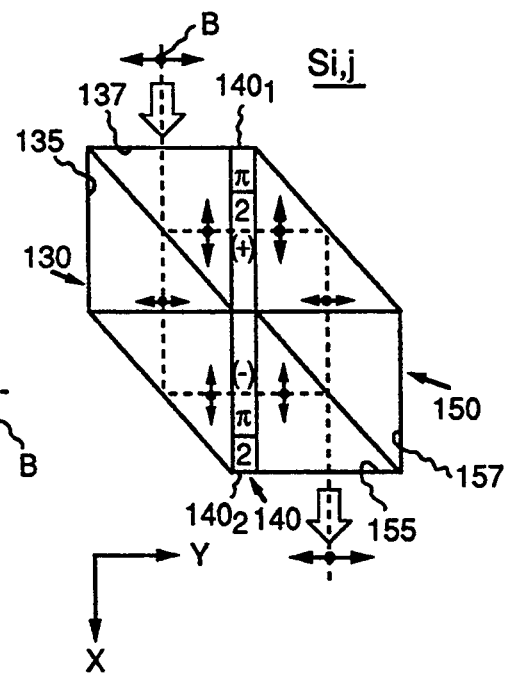

FIGS. 2C and 2D illustrate operation of an ISC $S_{i,j}$ with predetermined pixels of SLM 140 respectively set to cooperatively impart a phase differential of 0°, and 180°, respectively, when optical beam B is received along the second input face 137 of ISC $S_{i,j}$. The operation is identical to that described above with the exception that the 0° phase differential setting of predetermined pixels of SLM 140 results in the substantially coherent output beam emerging along the second axis (here the Y axis) and the 180° phase differential setting of predetermined pixels of SLM 140 results in the substantially coherent output beam emerging along the first axis (here the X axis).

FIG. 1 illustrates operation of switching matrix in the context of light beams $K_1$ and $K_2$ received, respectively, by ISCs $S_{1,1}$ and $S_{2,1}$, each in the first column of the switching matrix. For purposes of explanation of operation, it will be assumed that predetermined pixels $140_1$ and $140_2$ of SLM 140 of ISCs $S_{1,1}$ and $S_{2,2}$ are respectively set to cooperatively impart a 180° phase differential between optical beams passing therethrough, while predetermined pixels pixels $140_1$ and $140_2$ of SLMs in all remaining ISCs are respectively set to impart a 0° phase differential between light beams passing therethrough. It should be understood that while FIG. 1 illustrates only one light beam received by each ISC for simplicity of illustration, each ISC can simultaneously handle many light beams, for example, more than about $10^4$ light beams per cm$^2$.

In accordance with the aforementioned selected settings, recombined substantially coherent light beam $K_1$ emerges from second switch unit 150 of ISC $S_{1,1}$ along the Y axis. ISC $S_{1,2}$ located in a column subsequent to the first column $C_1$ is optically coupled to receive the light beam from ISC $S_{1,1}$ passed along the Y axis. Since predetermined pixels of the SLM in ISC $S_{1,2}$ are respectively set to the 0° phase differential setting, the recombined beam $K_1$ emerges from ISC $S_{1,2}$ along the X axis. ISC $S_{2,2}$ located in a row subsequent to the first row is optically coupled to receive the light beam from ISC $S_{1,2}$ passed along the X axis and since the predetermined pixels of SLM 140 in ISC $S_{2,2}$ are respectively set to cooperatively impart a 180° phase differential between light beams passing therethrough, recombined beam $K_1$ emerges from ISC $S_{2,2}$ along the X axis so as to reach a selected output port $L_2$. Again referring to FIG. 1, analysis analogous to the one described in reference to beam $K_1$ indicates that beam $K_2$ propagates through the switching matrix to a selected output port $L_1$. In FIG. 1, a phantom line between ISCs indicates other possible optical paths for light beams propagating through the matrix but not specifically selected here, given the assumed selected settings. Focusing of the multiple light beams passing between each pair of adjacent ISCs is desirable to minimize crosstalk. An optical lens 170, or alternatively a lens array, can be advantageously optically coupled between adjacent ISCs to focus the light beams.

Figure 3A:
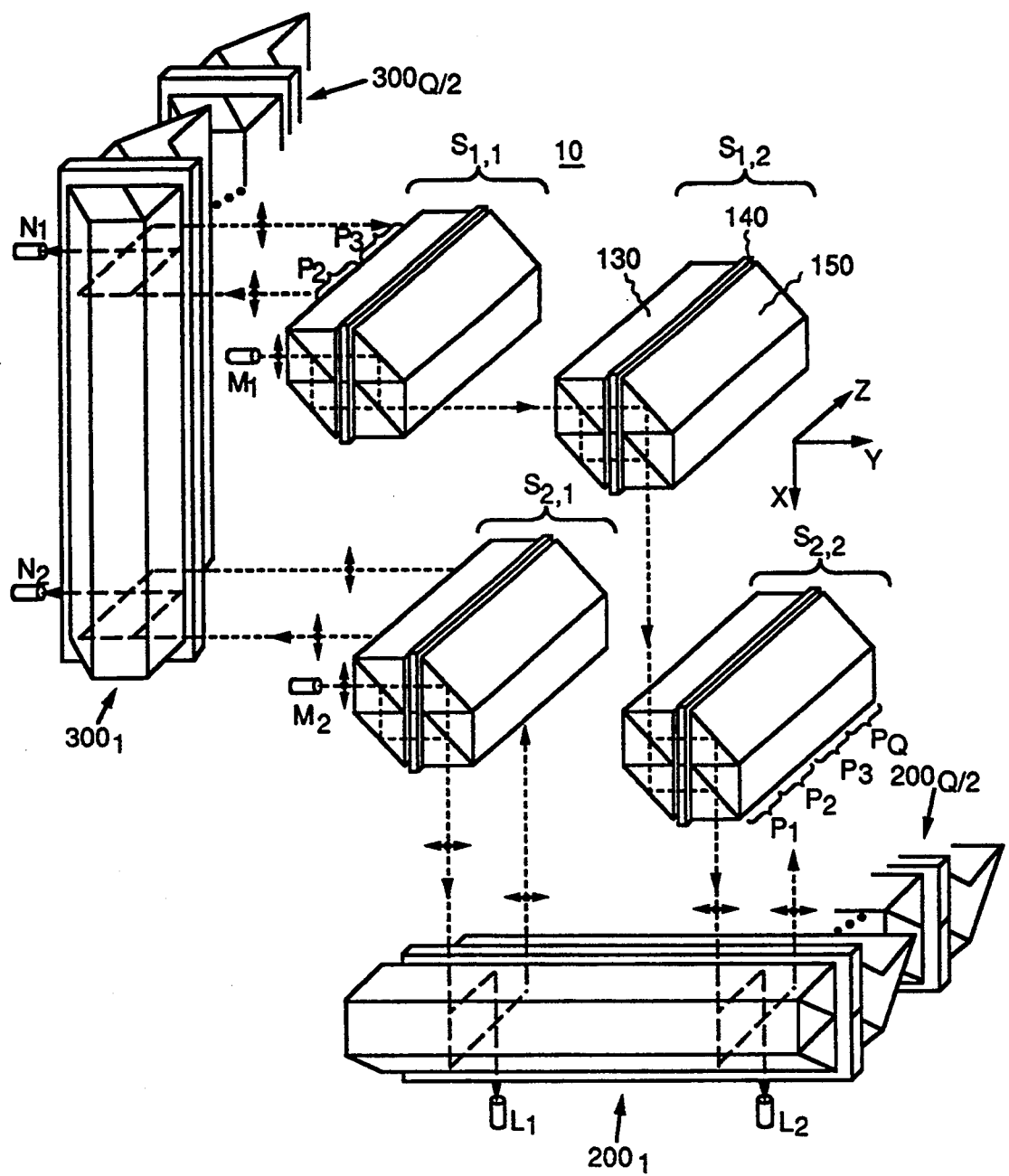
FIG. 3A is a schematic perspective view of another embodiment in accordance with the present invention.

FIG. 3A illustrates an interferometric switching device 10 which comprises a succession of stacked switching matrices identified by alternate odd and even numbers (e.g., $P_1$, $P_2$, $P_3 \ldots P_Q$). In general device 10 comprises a plurality of Q matrices substantially similar to the one illustrated and described in the context of FIG. 1. Each of the Q matrices is positioned in parallel alignment with each other across a common axis perpendicular to their rows and columns (e.g. the Z axis extending perpendicular to the X and Y axes). As illustrated in FIG. 3A, respective optical components of successive ISCs $S_{i,j}$ in each of the Q switching matrices may be constructed integral to each other. Thus, each SLM, located in the same ith row and jth column of successive matrices ($P_1$, $P_2 \ldots P_Q$), which extends parallel to the X axis may be formed by a single elongated SLM 140 additionally extending parallel to the Z axis. A similar integral construction may also be provided for each of the first and second switch units of successive ISCs $S_{i,j}$ (i.e., first switch unit 130 and second switch unit 150). This integral construction reduces manufacturing costs and also improves optical alignment between successive switching cells. FIG. 3A further illustrates row interferometric means $200_1, \ldots 200_{Q/2}$ each capable of optically coupling an associated pair of consecutive switching matrices in which an odd matrix is followed by an even matrix. For example, row interferometric means $200_1$ is capable of optically coupling switching matrix $P_1$ to matrix $P_2$.

Figure 3B:
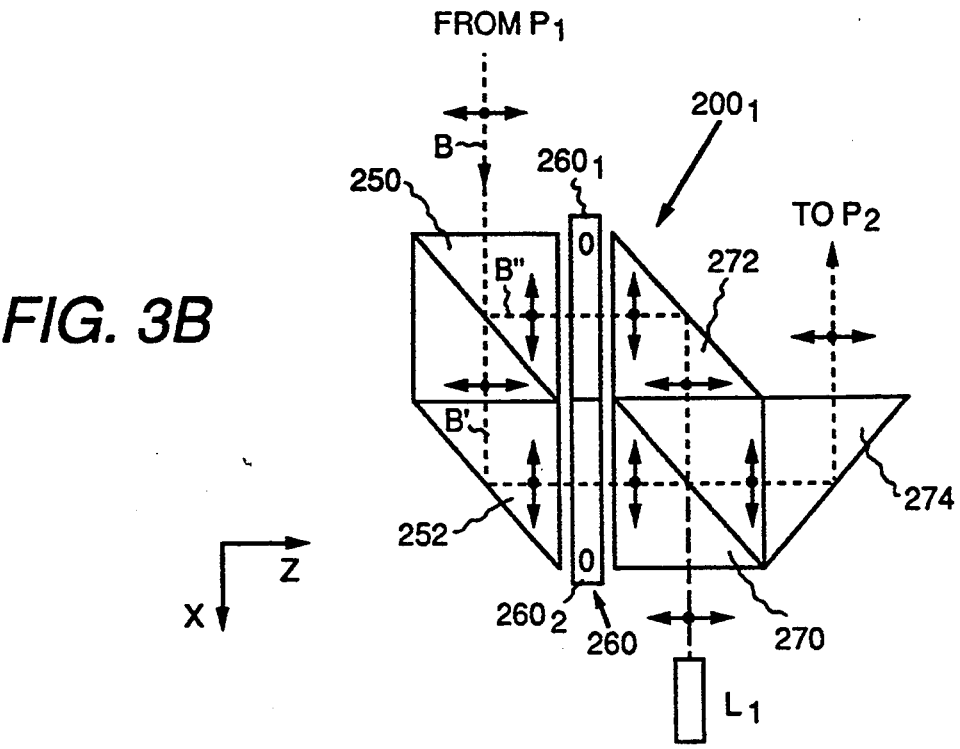
FIG. 3B is a side elevation view of the row interferometric means shown in FIG. 3A.

As illustrated in FIG. 3B, each row interferometric means (e.g., $200_1$) comprises a first row end beamsplitter 250 optically coupled to receive substantially coherent light beams from the last row of a predetermined odd matrix (e.g., matrix $P_1$). First row end beamsplitter 250 splits each received optical beam into a substantially identical constituent pair of beams B' and B''. First row end beamsplitter 250 cooperates with an associated first TIR prism 252 to direct beams B' and B'' along the common axis (here the Z axis). A row end SLM 260 is optically coupled to receive beams B' and B'' directed along the common axis.

The row end SLM 260 typically includes a two-dimensional array of individually controllable pixels pixels $260_1$ and $260_2$ capable of selectively shifting the phase of each beam pair passing therethrough. The row interferometric means further comprises a second row end beamsplitter 270 and an associated second TIR prism 272 optically coupled to combine each constituent beam pair received from row end SLM 260. In particular a beam pair having a phase differential of 180°, as can be selectively imparted via SLM 260, has respective components thereof combined along predetermined coincident collinear paths in the second row end beamsplitter 270 to interferometrically form a substantially coherent light beam (represented by the long dashed line) directed to a selected output port $L_1$ associated with the row interferometric means, while a beam pair having a 0° phase differential (as specifically exemplified in FIG. 3B) has respective components thereof combined along such predetermined coincident collinear paths to interferometrically form a substantially coherent light beam directed along the Z axis. A third TIR prism 274 is optically coupled to receive the coherent light beam along the Z axis and to deflect such received light beam to the last row of ISCs of the next subsequent even matrix (i.e., matrix $P_2$) for further propagation within that subsequent even matrix.

FIG. 3A also illustrates column interferometric means $300_1 \ldots 300_{Q/2}$ each capable of optically coupling an associated pair of consecutive switching matrices in which an even matrix is followed by an odd matrix. For example, column interferometric means $300_1$ is capable of optically coupling switching matrix $P_2$ to matrix $P_3$.

Figure 3C:
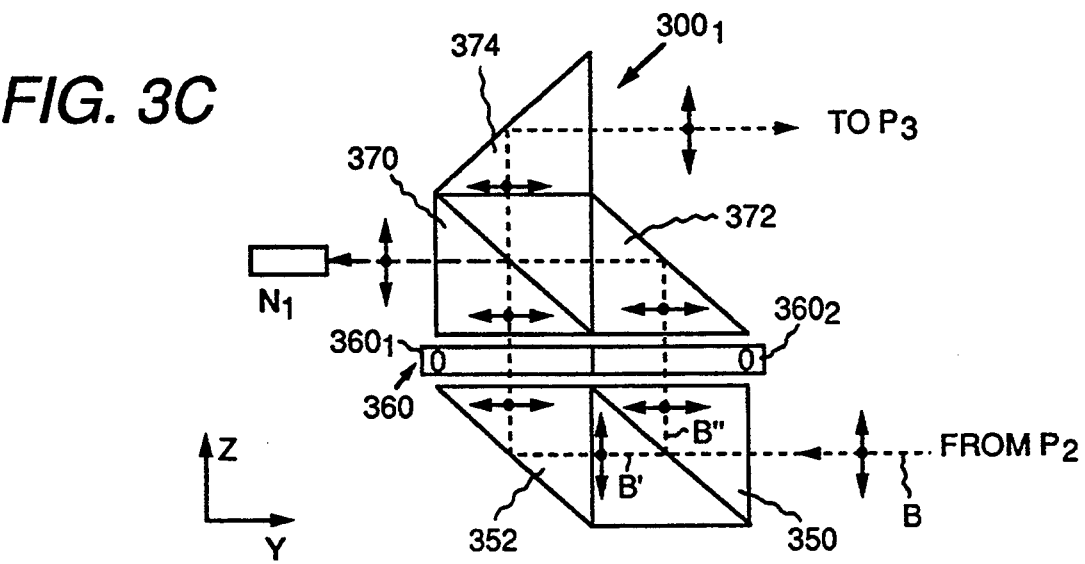
FIG. 3C is a top plan view of the column interferometric means shown in FIG. 3A.

In FIG. 3C, each column interferometric means is shown to comprise a first column end beamsplitter 350 optically coupled to receive substantially coherent optical beams from the first column of a predetermined even matrix (e.g., matrix $P_2$). First column end beamsplitter 350 splits each received optical beam B into a substantially identical constituent pair of beams B' and B''. First column end beamsplitter 350 cooperates with an associated first TIR prism 352 to direct beams B' and B'' along a common axis (here the Z axis). A column end SLM 360 is optically coupled to receive beams B' and B'' directed along the common axis.

The column end SLM 360 typically includes an array of individually controllable pixels $360_1$ and $360_2$ capable of selectively phase-shifting each beam pair passing therethrough. The column interferometric means further comprises a second column end beamsplitter 370 and an associated second TIR prism 372 optically coupled to combine each constituent beam pair received from the row end SLM 360. In particular a beam pair having a phase differential of 180° has respective components thereof combined along predetermined coincident collinear paths to interferometrically form a substantially coherent optical beam (represented by the long dashed line) directed to a selected output port $N_1$ associated with the column interferometric means, while a beam pair having a phase differential of 0° (as specifically exemplified in FIG. 3C) is combined along such predetermined coincident collinear paths to form a substantially coherent optical beam directed along the common axis (here the Z axis). A third TIR prism 374 is optically coupled to receive the optical beam along the common axis and to deflect each received optical beam to the first column of ISCs of the next subsequent odd matrix (i.e., matrix $P_3$) for further propagation within that subsequent odd matrix.

In accordance with the embodiment of FIG. 3A, in each ISC of an odd matrix the SLM and first and second switch units cooperate to propagate optical beams through the odd matrix in ascending column order within a row and in ascending row order within a column, while in each ISC of an even matrix the SLM and first and second switch units cooperate to propagate signal beams through the even matrix in descending row order within a column and in descending column order within a row so that redirected optical beams may be switched to selected output ports.

In another aspect of the invention, the light output relationship between the first and second output axes of each ISC can be characterized in terms of a sinusoidal function whose argument is the phase differential between recombined light beams. Thus, in the general case, each ISC is not only capable an on-off mode of operation but can also spatially multiplex an output beam along both of the first and second output axes. In accordance with this aspect of the invention, predetermined pixels in the SLM of an ISC may be respectively set to cooperatively phase shift the optical beams passing therethrough to impart a predetermined phase differential having an intermediate value between 0° and 180°. Optical beams having this predetermined intermediate phase differential recombine to selectively form two optical beams simultaneously emerging along both the first and second axes for further propagation within the switching matrix. Thereby, each of the externally derived optical beams can be simultaneously directed to at least two selected output ports of the switching matrix.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An interferometric optical switching device having input ports and output ports, for simultaneously and individually directing a plurality of externally derived substantially coherent light beams received through at least one of said input ports to a selected plurality of said output ports of said device, said device comprising:

a plurality of interferometric switching cells arranged in columns and rows to form an optical switching matrix, each of said interferometric switching cells being independently controllable such that individual light beams received by each respective one of said switching cells can respectively emerge therefrom along at least one of first and second axes;

each interferometric switching cell located in the first column of said matrix being positioned to receive a portion of said plurality of externally derived light beams;

each interferometric switching cell in a predetermined column of said matrix subsequent to said first column being optically coupled to receive light beams passed along said second axis from an interferometric switching cell located in a preceding column of the same row, and each interferometric switching cell in a predetermined row of said matrix subsequent to the first row of said matrix being optically coupled to receive light beams passed along said first axis from a switching cell located in a preceding row of the same column; and each interferometric switching cell in the last row of said matrix being optically coupled to pass light beams from within said matrix to a respective one of said output ports;

whereby externally derived substantially coherent light beams applied simultaneously through said at least one of said input ports to said first column can propagate through said matrix so as to reach selected ones of said plurality of output ports without mutually blocking one another.

2. An interferometric optical switching device according to claim 1 wherein each of said interferometric switching cells comprises:

a first switch unit including respective beamsplitter means disposed to intercept light beams received by said interferometric switching cell;

a spatial light modulator optically coupled to said first switch unit, said spatial light modulator comprising an array of individually controllable pixels capable of selectively shifting phase of light beams passing therethrough; and a second switch unit optically coupled to said spatial light modulator, said second switch unit comprising respective beamsplitter means disposed to interferometrically form light beams along a selected one of said first and second axes in accordance with a phase differential imparted by the spatial light modulator pixels between light beams passing therethrough.

3. An interferometric optical switching device according to claim 2 and further comprising at least one lens optically coupled between adjacent ones of said interferometric switching cells and situated to focus light beams passing therethrough.

4. An interferometric optical switching device according to claim 3 wherein said device comprises a succession of additional switching matrices substantially identical to said optical matrix, said optical matrix and said additional matrices comprising a stack of matrices identified by alternate odd and even designations, said stacked matrices being positioned in parallel alignment with each other across a common axis perpendicular to the rows and columns of said stacked matrixes.

5. An interferometric optical switching device according to claim 4 and further comprising row interferometric means capable of optically coupling each pair of consecutive stacked matrices in which an odd numbered matrix is followed by an even numbered matrix;

each of said row interferometric means comprising a first row end beamsplitter and a first row end prism, said first row end beamsplitter being optically coupled to receive substantially coherent light beams from the last row of said odd numbered matrix and to split each received light beam into a substantially identical constituent pair of beams, said first row end prism cooperating with said first row end beamsplitter to direct each of said constituent beam pairs received from said odd numbered matrix along said common axis;

a row end spatial light modulator optically coupled to receive said directed beam pairs, said row end spatial light modulator including an array of individually controllable pixels patterned such that each of said beam pairs from said first row end beamsplitter passes through a respective pixel pair, each of said pixel pairs in said row end spatial light modulator being adapted to selectively shift the phase differential between each beam pair passing therethrough;

each of said row interferometric means further comprising a second row end beamsplitter and second and third row end prisms, said second row end beamsplitter and said second row end prism being optically coupled to combine each constituent beam received from said row end spatial light modulator such that a beam pair phase-shifted to have a phase differential of 180° forms a substantially coherent light beam directed to an output port associated with said row interferometric means, while a beam pair having a phase differential of 0° forms a substantially coherent light beam directed along said common axis toward said third row end prism, said third row end prism being disposed to optically couple incident light beams to the last row cell of the next subsequent even numbered matrix for further propagation within said subsequent even numbered matrix;

whereby substantially coherent light beams received by said subsequent even numbered matrix may be directed to said selected ones of said plurality of output ports by the interferometric switching cells located in said subsequent even numbered matrix.

6. An interferometric optical switching device according to claim 5 and further comprising column interferometric means capable of optically coupling each pair of consecutive stacked matrices in which an even numbered matrix is followed by an odd numbered matrix;

each of said column interferometric means comprising a first column end beamsplitter and a first column end prism, said first column end beamsplitter being optically coupled to receive substantially coherent light beams from the first column of said even numbered matrix and to split each received light beam into a substantially identical constituent pair of beams, said first column end beamsplitter cooperating with said first column end prism to direct each of said beam pairs received from said even numbered matrix along said common axis;

a column end spatial light modulator optically coupled to receive said directed beam pairs, said column end spatial light modulator including an array of individually controllable pixels patterned such that each of said beam pairs from said first column end beamsplitter passes through a respective pixel pair, each of said pixel pairs in said column end spatial light modulator being adapted to selectively shift the phase differential between each beam pair passing therethrough;

each of said column interferometric means further comprising a second column end beamsplitter and second and third column end prisms, said second column end beamsplitter and said second column end prism being optically coupled to combine each constituent beam pair received from said column end spatial light modulator such that a beam pair phase-shifted to have a phase differential of 180° forms a substantially coherent light beam directed to an output port associated with said column interferometric means, while a beam pair having a phase differential of 0° forms a substantially coherent light beam directed along said common axis toward said third column end prism, said third column end prism being disposed to optically couple incident light beams to the first column cell of the next subsequent odd numbered matrix for further propagation within said subsequent odd numbered matrix;

whereby each interferometric switching cell of a predetermined odd numbered matrix cooperates to propagate light beams through said predetermined odd numbered matrix in ascending column order within a row and in ascending row order within a column, and each interferometric switching cell of a predetermined even numbered matrix cooperates to propagate light beams through said predetermined even numbered matrix in descending row order within a column and in descending column order within a row.

7. An interferometric optical switching device according to claim 6 wherein each first switch unit of interferometric switching cells identically located in each of said stacked matrices is integral to each other so as to form an elongated first switch unit extending substantially parallel to said common axis.

8. An interferometric optical switching device according to claim 6 wherein each spatial light modulator of interferometric switching cells identically located in each of said stacked matrices is integral to each other so as to form an elongated spatial light modulator extending substantially parallel to said common axis.

9. An interferometric optical switching device according to claim 6 wherein each second switch unit of interferometric switching cells identically located within each of said stacked matrices is integral to each other so as to form an elongated second switch unit extending substantially parallel to said common axis.

10. An interferometric optical switching device according to claim 6 wherein:
each first switch unit of interferometric switching cells identically located within each of said stacked matrices is integral to each other so as to form an elongated first switch unit extending substantially parallel to said common axis;
each spatial light modulator of interferometric switching cells identically located within each of said stacked matrices is integral to each other so as to form an elongated spatial light modulator extending substantially parallel to said common axis; and
each second switch unit of interferometric switching cells identically located within each of said stacked matrices is integral to each other so as to form an elongated second switch unit extending substantially parallel to said common axis.

11. An interferometric optical switching device according to claim 10 wherein each of said interferometric switching cells is capable of simultaneously directing each received light beam, in accordance with the phase differential between light beams passed through the spatial light modulator, along both of said first and second axes for further propagation within said device;

whereby each externally derived coherent light beam can be simultaneously directed to at least two of said plurality of output ports of said device.

12. An interferometric optical switching device according to claim 2 wherein each of said interferometric switching cells is capable of simultaneously directing each received light beam, in accordance with the phase differential between light beams passed through the spatial light modulator, along both of said first and second axes for further propagation within said device;

whereby each of said externally derived substantially coherent light beams can be simultaneously directed to at least two of said plurality of output ports of said device.

13. An interferometric optical switching device having a plurality of ports, for simultaneously and individually directing a plurality of externally derived substantially coherent light beams to selected ones of said plurality of ports, said device providing bidirectional communication between predetermined ones of said ports and comprising:

a plurality of interferometric switching cells arranged in cell columns and cell rows to form an optical switching matrix, each of said interferometric switching cells independently controllable such that individual light beams received by each respective one of said switching cells can respectively emerge therefrom along either one of first and second axes;

each interferometric switching cell located in the first cell column of said matrix and each interferometric switching cell located in the last cell row of said matrix being positioned to receive respective portions of said plurality of externally derived light beams or to pass light beams from within said matrix to said ports; and each interferometric switching cell in a cell column of said matrix subsequent to said first cell column being optically coupled to receive or to pass light beams with respect to a switching cell located in a preceding cell column of the same cell row, and each interferometric switching cell in a cell row of said matrix preceding said last cell row being optically coupled to receive or to pass light beams with respect to a switching cell located in a subsequent cell row of the same cell column;

whereby externally derived light beams applied simultaneously through at least one of said ports, other than said selected ones of said plurality of ports, to said first cell column or said last cell row can propagate through said matrix so as to reach said selected ones of said plurality of ports without mutually blocking one another.

14. An interferometric optical switching device according to claim 13 wherein each of said interferometric switching cells comprises:

a first switch unit including a respective beamsplitter means disposed to intercept light beams received or passed by said interferometric switching cell;

a spatial light modulator optically coupled to receive or to pass light beams with respect to said first switch unit, said spatial light modulator comprising an array of individually controllable pixels capable of selectively shifting a phase differential between light beams passing therethrough; and a second switch unit comprising beamsplitter means optically coupled to receive or to pass light beams with respect to said spatial light modulator, each of said first and second switch units being capable of selectively directing light beams from said spatial light modulator along either of said first and second axes, in accordance with the phase differential between light beams passed through the spatial light modulator pixels.

15. An interferometric optical switching device according to claim 14 and further comprising at least one lens optically coupled between adjacent ones of said interferometric switching cells and situated to focus light beams passing therethrough.

16. An interferometric optical switching device according to claim 15 wherein each of said interferometric switching cells is capable of simultaneously directing each received light beam, in accordance with the phase differential between light beams passed through the spatial light modulator pixels, along both of said first and second axes for further propagation within said matrix;

whereby each externally derived coherent light beam can be simultaneously directed to at least two selected ones of said plurality of ports.

17. An interferometric optical switching device according to claim 14 wherein each of said interferometric switching cells is capable of simultaneously directing each received light beam, in accordance with the phase differential imparted by the spatial light modulator between light beams passed through the spatial light modulator pixels, along both of said first and second axes for further propagation within said matrix;

whereby each externally derived substantially coherent light beam can be simultaneously directed to at least two selected ones of said plurality of ports.

* * * * *